G. RICHARDS & W. W. BEAUMONT.
MEANS APPLICABLE FOR USE IN MILLING SCREW THREADS.
APPLICATION FILED MAY 6, 1918.
1,295,063.
Patented Feb. 18, 1919.
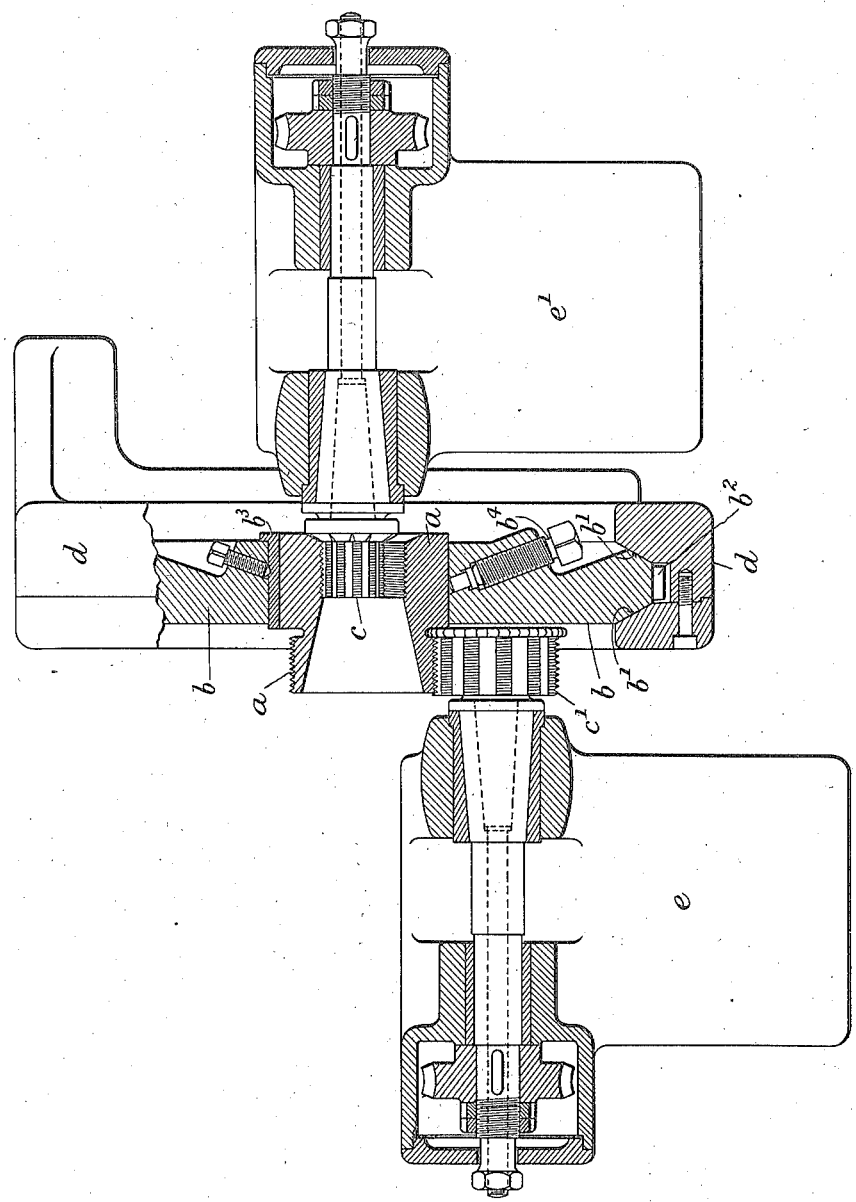
Inventors.
George Richards,
William Worby Beaumont.

UNITED STATES PATENT OFFICE.

GEORGE RICHARDS AND WILLIAM WORBY BEAUMONT, OF LONDON, ENGLAND.

MEANS APPLICABLE FOR USE IN MILLING SCREW-THREADS.

1,295,063.  Specification of Letters Patent.  Patented Feb. 18, 1919.

Application filed May 6, 1918. Serial No. 232,856.

*To all whom it may concern:*

Be it known that we, GEORGE RICHARDS, a citizen of the United States, and WILLIAM WORBY BEAUMONT, a subject of the King of Great Britain and Ireland, both residing at The Outer Temple, 222 Strand, London, England, have invented new and useful Improved Means Applicable for Use in Milling Screw-Threads, of which the following is a specification.

In the specification to the British patent, dated the 15th October, 1915, No. 14571*, are described means for milling screw-threads in the external surfaces of bodies by means of a rotary cutter, known as a "hob"; and in the specification to the British patent dated the 18th October, 1916, No. 14793, are described similar means for milling screw-threads in the internal surfaces of bodies. In both instances, the cutting teeth of the hob follows the line of a spiral thread having a pitch corresponding with that of the thread to be milled in the work under treatment, and both the hob and the work are rotated at a uniform speed, but neither partakes of any axial movement.

Our present invention relates to means whereby both external and internal threads can be simultaneously cut in a piece of work so short that the respective threaded portions are in the same transverse plane or nearly so.

In the accompanying drawing are represented, in longitudinal section, means applicable for use in carrying our invention into effect.

The work $a$ is mounted in a chuck or carrier $b$ in such a manner as to afford access thereto, by the hobs $c$, $c'$ from opposite sides thereof. The hobs and the work revolve at the same rotative speed, and there is no axial movement of either hob or work. The central portion of the machine wherein the work is carried and rotated is so constructed that the two cutters and their supports may closely approach the same transverse plane and simultaneously operate on a short piece of work such as the internally and externally threaded nose-piece of a jointed shell. With this object, we employ a disk-like work-holder $b$ whereof the periphery is formed with bearing surfaces $b'$ $b'$ of a truncated V shape, same being housed in a fixed bi-part carrier $d$, formed with corresponding bearing surfaces. The extreme periphery of the disk-like work-holder is provided with spur or worm teeth $b^2$ and derives rotative motion from a spur pinion or a worm. The piece of work $a$ is secured, centrally in the holder $b$, by means of a multi-jaw chuck, or by split collets or bushes $b^3$, or by means of set-screws $b^4$ which may be introduced through one of the faces of the holder $b$ or through vacancies formed therein.

The above described means for simultaneously screw-threading a piece of work both internally and externally and practically in the same plane are equally applicable for use with ordinary milling cutters, as distinguished from hobs. In this case, a slow rotative motion is imparted to the disk-like work-holder $b$ in which the work $a$ is mounted; or, according to an alternative method, the work is held stationary and the milling cutter, while rotating on its own axis, is caused to make a complete planetary movement about the axis of the work. According to these methods of working, the rotary cutters cut the threads to their full depth during one complete revolution of the work, or while making one complete planetary movement about the axis thereof, and at the same time advance axially a distance corresponding with the pitch of the thread to be cut. It will be understood that, when working according to either of these methods, the milling cutters are of a character confined to thread-cutting, as distinguished from thread-cutting and facing or thread-cutting and grooving, as illustrated in the drawing. It will also be understood that each of the slides $e$ $e'$ is provided with means for moving it in the direction of its cutter-spindle as also transversely thereto.

We claim:—

1. A work-carrier adapted for use in simultaneously cutting both external and internal screw-threads in the same piece of work and approximately in the same plane; comprising a disk-like work-holder provided with means for holding the work centrally and in such a manner as to render both its extremities accessible for treatment with hobs or milling cutters; the said work-holder being mounted in a circumferential carrier adapted to afford the holder direct and continuous peripheral support, substantially as herein described.

2. A work-carrier adapted for use in simultaneously cutting both external and internal screw-threads in the same piece of work and approximately in the same plane, comprising a disk-like work-holder formed as to its periphery with V-shaped bearing surfaces, provided with spur or worm teeth whereby it may be rotated, and mounted in a bi-part carrier formed with corresponding bearing surfaces and adapted to afford the holder continuous peripheral support, substantially as herein described.

GEORGE RICHARDS.
W. WORBY BEAUMONT.